April 26, 1949.    J. C. GAUVEY    2,468,364
AUXILIARY SPRING
Filed Dec. 24, 1946    2 Sheets-Sheet 1
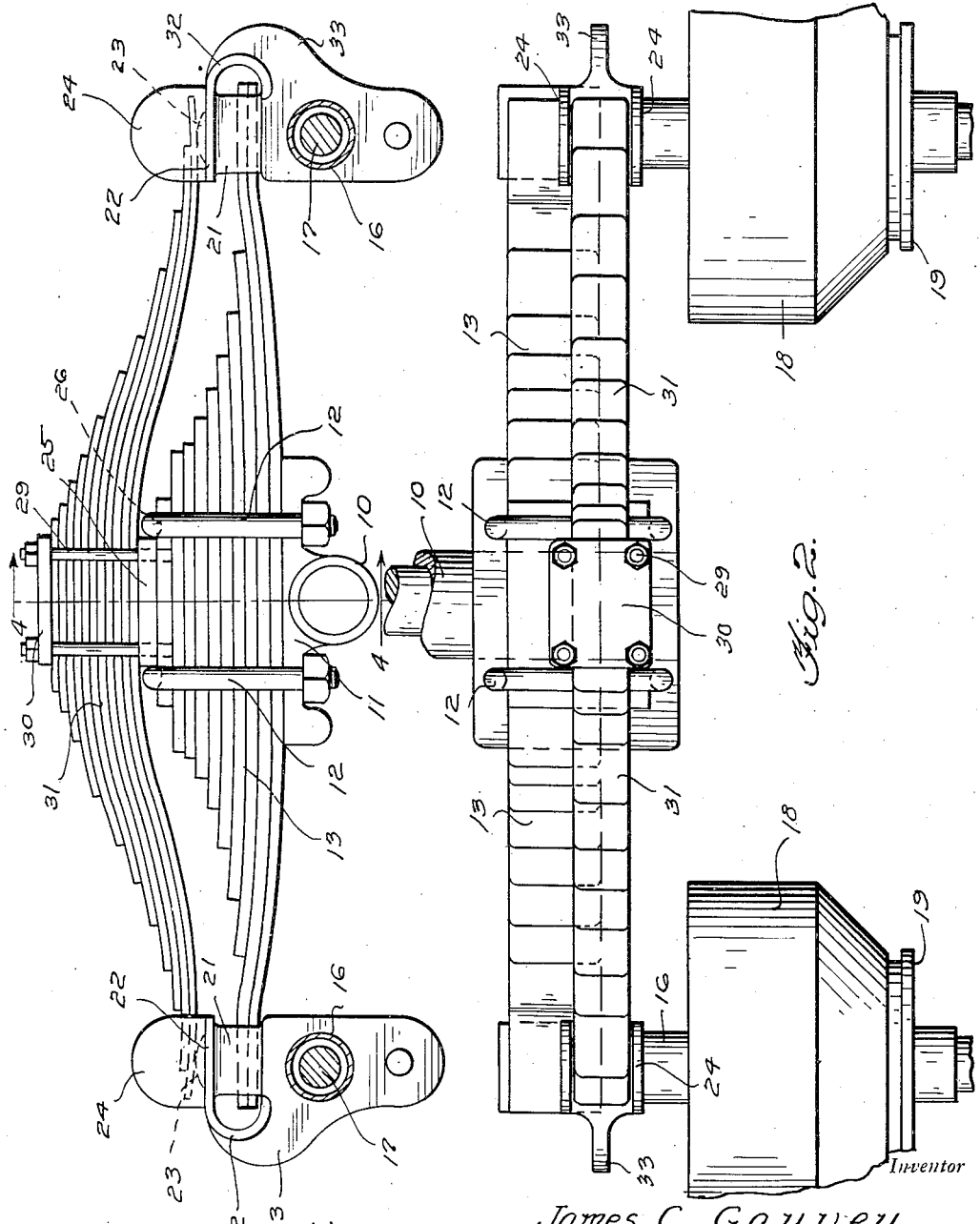
Inventor
James C. Gauvey,
By Clarence A. O'Brien
and Harvey B. Jacobson
Attorneys April 26, 1949.  J. C. GAUVEY  2,468,364
AUXILIARY SPRING
Filed Dec. 24, 1946  2 Sheets—Sheet 2
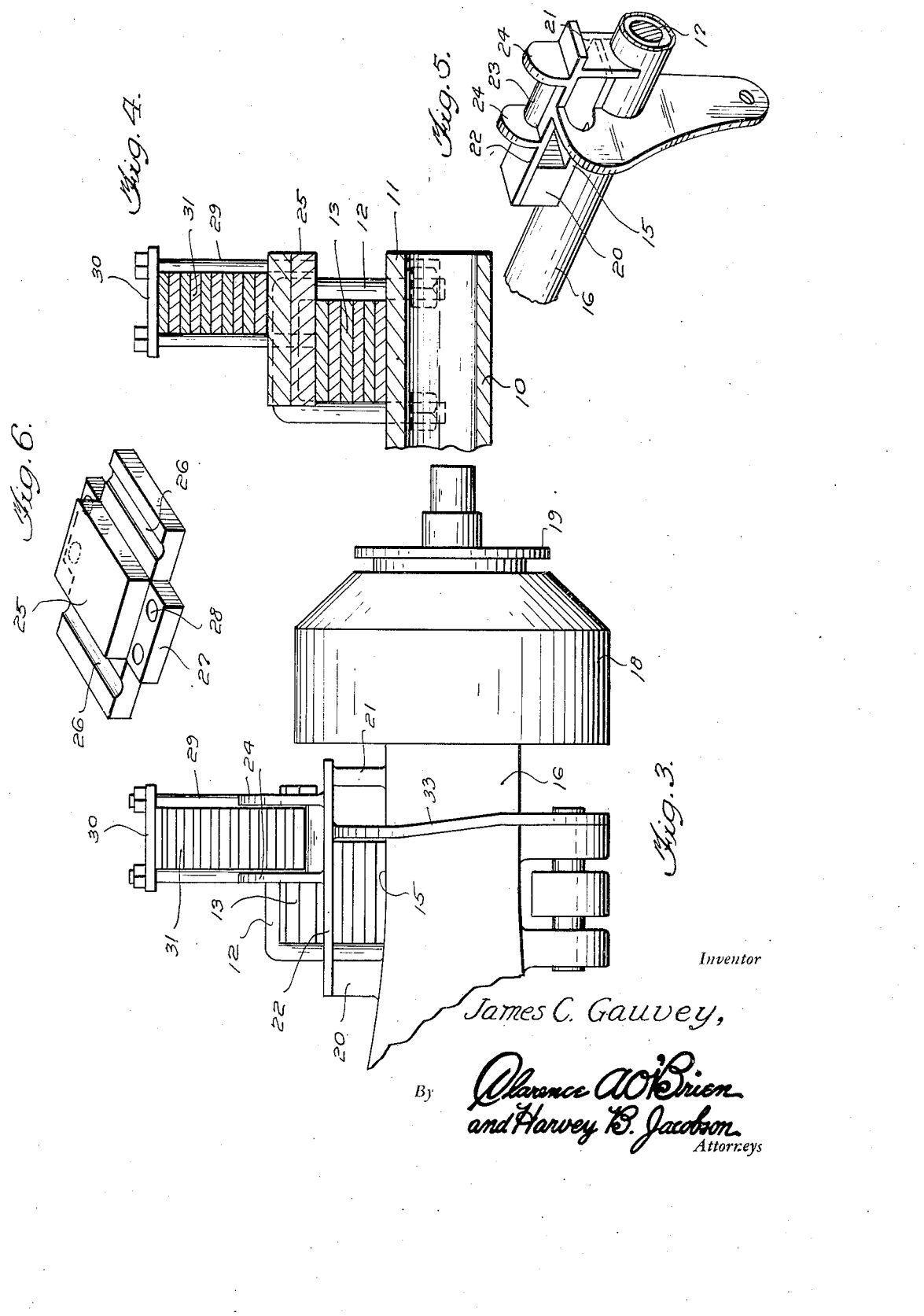

Patented Apr. 26, 1949

2,468,364

UNITED STATES PATENT OFFICE 2,468,364

AUXILIARY SPRING

James C. Gauvey, Monahans, Tex., assignor of one-third to Victor B. Gilbert, El Paso, Tex.

Application December 24, 1946, Serial No. 718,169

1 Claim. (Cl. 267—36)

This invention relates to an auxiliary or helper spring and has for its primary object to facilitate the handling of heavy loads on spring suspended vehicle bodies.

Another object is to avoid breakage of the main vehicle spring when heavy loads are to be carried by the vehicle.

The above and other objects may be attained by employing this invention which embodies among its features a semielliptical helper spring attached to the medial portion of a semielliptical vehicle spring upon opposite ends of which axles are attached and brackets carried by the axles to hold the ends of the helper spring in spaced relation to the respective ends of the vehicle spring.

Other features include pads carried by brackets and guides at opposite ends of the pads to hold the helper spring in proper alignment with relation to the vehicle springs.

In the drawings:

Figure 1 is a side view of a vehicle spring illustrating this helper spring in position to function in connection therewith.

Figure 2 is a top plan view of Figure 1 illustrating the wheel hubs on the axles.

Figure 3 is an end view of Figure 2.

Figure 4 is a transverse sectional view taken substantially on the line 4—4 of Figure 1.

Figure 5 is a fragmentary perspective view of one of the axles showing the spring supporting and guiding bracket, and Figure 6 is a perspective view of the anchoring pad between the springs.

Referring to the drawings in detail, a cross member 10 for supporting the weight of the body of a vehicle extends beneath a conventional plate 11 to which is attached as by U bolts 12 a conventional semi-elliptical vehicle spring 13, opposite ends of which are supported in a conventional manner upon a plate 15 which is welded or otherwise secured to a conventional axle housing 16 in which axles 17 are supported. The axles 17 are of conventional form and carry adjacent their outer ends conventional brake drums 18 and wheel hubs 19. The structure so far described is typical of the conventional spring suspension employed on trucks and like vehicles which are designed to carry heavy loads.

In order to assist in sustaining the load on a truck I weld or otherwise attach to the inner end of each pad 15, on the axle housing 16 of each axle, a block 20, and adjacent the outer end of each pad 15 to the axle housing 16 I weld a bracket 21. It is to be understood that the bracket 21 and block 20 support at their upper ends a horizontally disposed plate 22 which may be formed integrally with the block and bracket so that the entire unit may be attached to the axle housing 16 in any conventional manner as by welding. Extending upwardly from the plate 22 intermediate its ends is a wear pad or plate 23 and rising upwardly from opposite ends of the pad 23 are guides 24 between which opposite ends of the helper spring to be more fully hereinafter described are received. The space between the block 20 and the bracket 21 and beneath the plate 22 forms a pocket into which the adjacent end of the vehicle spring 13 is introduced as will be readily understood upon reference to Figure 1.

Seated on the medial portion of the vehicle spring 13 is a pad 25 having projections at opposite ends which are grooved as at 26 to receive the bight portions of the U bolts 12, and extending laterally from the pad 25 are flanges 27 each of which is formed with a pair of spaced openings 28 for the reception of clamping bolts 29, the opposite ends of which project through spaced openings formed in a clamping plate 30 which engages the medial portion of a helper spring 31. The opposite ends of the helper spring 31 seat on the pads 23 between the guides 24 so that the helper spring will properly be held in place with relation to the vehicle spring 13.

In use it will be understood that as the vehicle is loaded the ends of the springs 13 and 31 will bear on opposite ends of the axle housings 16 and danger of injury to the vehicle springs 13 will be materially lessened through the use of the auxiliary or helper springs 31.

As illustrated in Figure 1 one side edge of each plate 22 is extended and curved downwardly as at 32 to join the pad 15 and enclose the end of the spring 13 resting on the pad. A reinforcing web 33 is carried downwardly and encircles the axle housing 16 to lend strength to the curved portion 32 previously described.

While in the foregoing there has been shown and described the preferred embodiment of this invention it is to be understood that minor changes in the details of construction, combination and arrangement of parts may be resorted to without departing from the spirit and scope of the invention as claimed.

What I claim:

In a vehicle suspension system embodying spaced parallel axles, a load sustaining bar midway between said axles in parallel relation thereto, a spring supporting pad fixed to each axle adjacent each end thereof, parallel semi-elliptical main load sustaining springs extending between the axles with their ends resting on the pads on the axles, and pads resting on the medial portions of the springs and connected by U-bolts to the load sustaining bar adjacent opposite ends thereof, a helper spring structure for each main load sustaining spring comprising a plate supported by each axle pad above the adjacent end of each main load sustaining spring, a semi-elliptical spring extending above each main load sustaining spring, opposite ends of each helper spring resting on said plates, U-bolts coupling the medial portion of the helper spring to the pad on the medial portion of the main load sustaining spring, and guides extending upwardly from each plate on each side of the helper springs.

JAMES C. GAUVEY.

REFERENCES CITED

The following references are of record in the file of this patent:

UNITED STATES PATENTS

| Number | Name | Date |
| --- | --- | --- |
| 1,763,767 | Fageol | June 17, 1930 |
| 2,109,191 | Contardi | Feb. 22, 1938 |
| 2,139,937 | Collender | Dec. 13, 1938 |
| 2,415,533 | Rainsford | Feb. 11, 1947 |